(12) United States Patent
Lee

(10) Patent No.: US 6,278,833 B1
(45) Date of Patent: Aug. 21, 2001

(54) LIGHT-EMITTING DEVICE FOR EMITTING NEON-LIKE LIGHT

(76) Inventor: Jean Hway Lee, 18F-2, No. 2, Lane 175, Sec. 3, Shiou-Lang Road, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/376,287

(22) Filed: Aug. 18, 1999

(51) Int. Cl.[7] .................................................. G02B 6/04
(52) U.S. Cl. ......................... 385/901; 385/100; 385/113; 385/115
(58) Field of Search .................... 385/401, 102, 385/115, 104, 109, 111, 116, 113; 362/32

(56) References Cited

U.S. PATENT DOCUMENTS

| | | | |
|---|---|---|---|
| 4,422,719 | * 12/1983 | Orcutt | 350/96.3 |
| 5,333,228 | * 7/1994 | Kingstone | 385/100 |
| 5,432,876 | * 7/1995 | Appeldorn et al. | 385/31 |
| 5,901,267 | * 5/1999 | Lee | 385/901 |
| 5,937,127 | * 8/1999 | Zarian et al. | 385/128 |
| 6,104,857 | * 8/2000 | Ishiharada et al. | 385/147 |

* cited by examiner

Primary Examiner—Frank G. Font
Assistant Examiner—Michael P. Mooney

(57) ABSTRACT

A light emitting device for emitting neon-like light, comprises a transparent pipe, a plurality of optical fibers within the transparent pipe, a protecting pipe within the transparent pipe, a flexible supporting wire located within the protecting pipe, and a plurality of micro-windows cut on the surface of each optical fiber such that the light propagating along each fiber leaks from the micro-windows, thus providing a surface emitting effect.

6 Claims, 4 Drawing Sheets

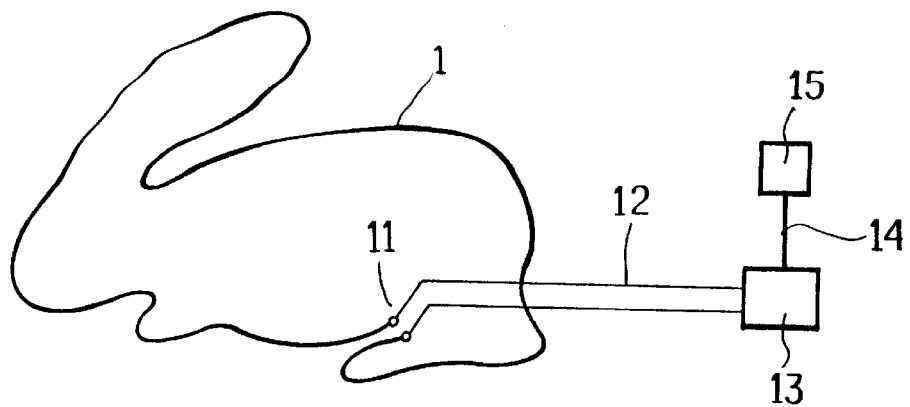
FIG.1 (Prior Art)
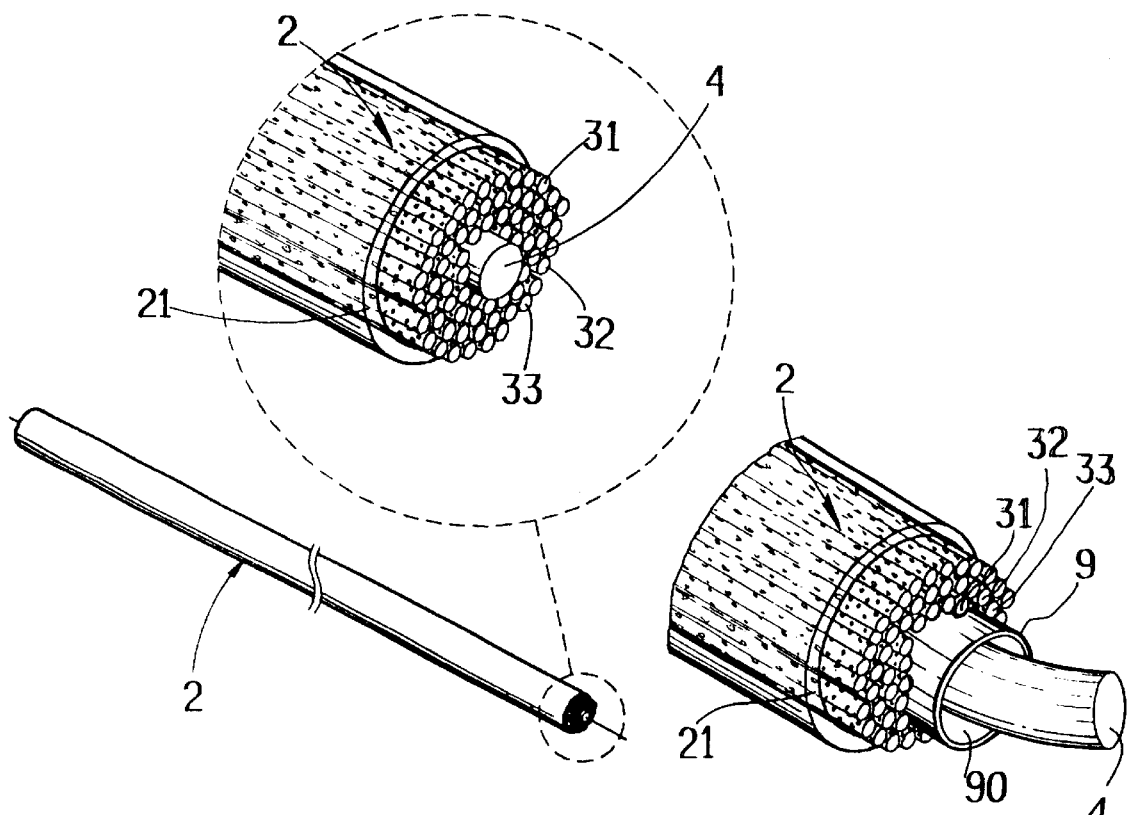
FIG.2
FIG.2-1

LIGHT-EMITTING DEVICE FOR EMITTING NEON-LIKE LIGHT

BACKGROUND OF THE INVENTION

1. Field of the Invention

The present invention relates to a light-emitting device for emitting neon-like light, which can emit neon-like light by the tube of the light-emitting device pro se, or through the micro-windows on the tube of the light-emitting device, and the main body of the light-emitting device can be bent to shape on user's demand.

2. Description of the Prior Art

As shown in FIG. 1, the conventional neon tube 1 generally comprises a glass tube having desired shape and filled with inert gas such as He and Ne. The power connection 11 of the neon tube 1 is, through a conductive wire 12, connected to a voltage booster 13. The voltage booster 13 is connected to a power supply 15 through a conductive wire 14. During the application thereof, a high voltage is generated through the action of the voltage booster 13 connected with the power supply 15 and used to drive the neon tube 1. However, the conventional neon tube 1 has the following drawbacks:

1. The neon tube 1 is filled with hazardous gas, which might leak into air and endanger the environment once the tube is broken.

2. The neon tube 1 requires a voltage booster 13 for operation, the voltage booster 13 emits high-frequency electromagnetic, which is hazardous to user.

3. The neon tube 1 is brittle, the repairing thereof is troublesome.

4. The neon tube 1 is operated in high voltage, which might cause fire.

5. Due the high voltage operation and the brittleness of the neon tube 1, the neon tube 1 is generally hung at high position and is hard to employ for indoor use.

6. The mounting of the neon tube requires professional operator.

7. The mounting cost is high.

8. The neon tube 1 has only a single color for a single tube, to achieve more vivid color, a plurality of neon tubes are required.

9. The neon tube 1 is controlled by PLC which switches the neon tube 1 in high frequency and is prone to malfunction.

SUMMARY OF THE INVENTION

It is an object of the present invention to provide a light-emitting device for emitting neon-like light to, overcome the above problems.

In one aspect of the present invention, the light-emitting device for emitting neon-like light comprises a flexible outer pipe enclosing a plurality of optical fibers. The outer pipe can prevent dust and shock which are harmful to the optical fibers therein. The outer pipe further comprises a flexible supporting wire therein, by which the light-emitting device can be bent to desired shape.

In another aspect of the present invention, a plurality of micro-windows are cut on the surface of each optical fiber and the cutting depth thereof exceeds the thickness of the cladding layer of the optical fiber. By those micro-windows, a surface emitting effect is provided beside the original line emitting effect provided by the optical fiber per se and the brightness is enhanced.

In still another aspect of the present invention, a color palette is arranged between the light-emitting device and the light source and has alternating transparent and opaque regions. The color palette can rotate to generate a more attractive effect. The light emitting device can be formed in arbitrary shapes and hung on the article to be decorated such as tree.

The various objects and advantages of the present invention will be more readily understood from the following detailed description when read in conjunction with the appended drawing.

BRIEF DESCRIPTION OF THE DRAWINGS

FIG. 1 shows a schematic diagram of a conventional neon tube;

FIG. 2 shows a perspective view of the light-emitting device according to the present invention;

FIG. 2-1 shows an enlarged view of part in FIG. 2;

DETAILED DESCRIPTION OF THE PREFERRED EMBODIMENTS

Figure 3:
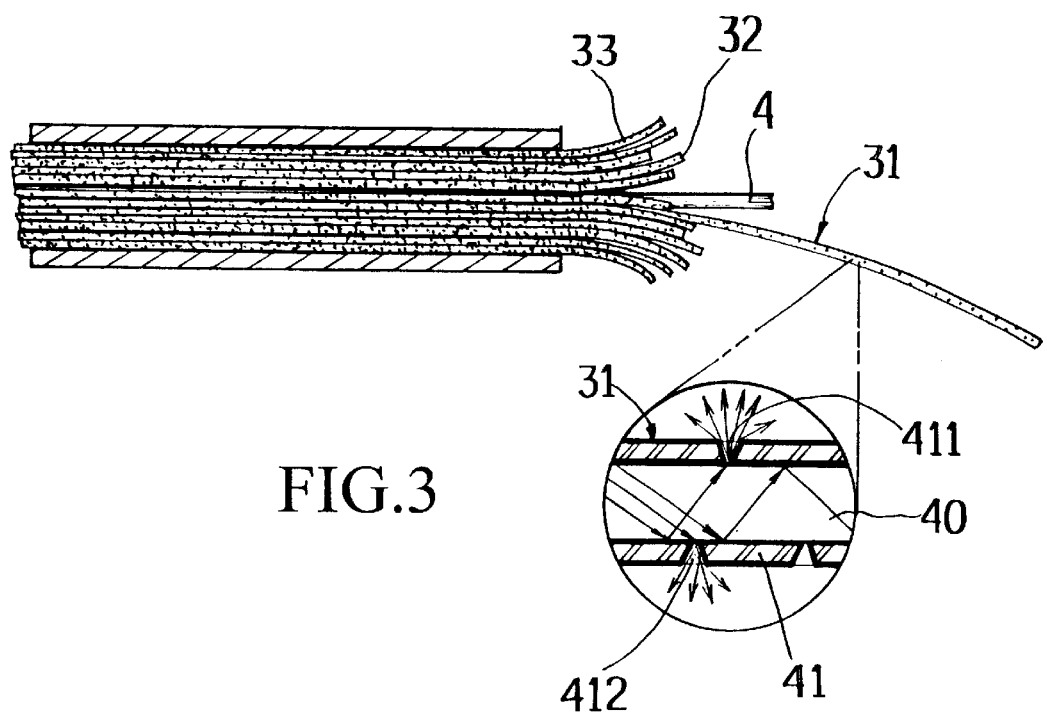
FIG. 3 shows a cross sectional view of the light-emitting device according to the present invention and an enlarged view thereof.

As shown in FIGS. 2-1, and 3, the light emitting device 2 comprises a transparent pipe 21, a plurality of optical fiber 31, 32 and 33 etc. within the transparent pipe 21, a protecting pipe 9 within the transparent pipe 21, a flexible supporting wire 4 arranged within the protecting pipe 9. Moreover, a gap 90 is formed between the flexible supporting wire 4 and the protecting pipe 9 to allow the flexible supporting wire 4 to bend freely and reduce the friction of the flexible supporting wire 4 on the protecting pipe 9. Therefore, the plurality of optical fibers 31, 32 and 33 can be protected from damage during the bending the light emitting device 2. The material of the protecting pipe 9 is preferably plastic which is flexible and has a smooth surface. Moreover, the color of the protecting pipe 9 is preferably similar to that of the plurality of optical fibers 31, 32 and 33. The protecting pipe 9 can be omitted when the shape of the light emitting device 2 is simple, for example, circular shape or other shape with few bends. In this situation, a greater number of fibers can be housed within the transparent pipe 21 to increase the brightness of the light emitting device 2. Moreover, when the shape of the light emitting device 2 is simple, for example, a circular shape or other shape with few bends, the thickness of the protecting pipe 9 can be increased to fill the gap 90, thus increasing the strength for supporting the light emitting device 2 together with the flexible supporting wire 4. The optical fiber comprises a core 40, a cladding 41 around the core 40, and a plurality of micro-windows 411 and 412 cut on the cladding 41 to expose the core 40. The plurality of optical fibers 31, 32 and 33 with micro-windows 411 and 412 can provide surface emitting effect when the light propagating along the core 40 leaks from the micro-windows 411 and 412. Moreover, a transparent pipe 21 is used to enclose the plurality of optical fiber 31, 32 and 33, so that an excellent surface light emitting effect can be obtained. Besides, the light emitting device 2 can be bent a to desired shape by bending the flexible supporting wire 4 therein.

Figure 4:
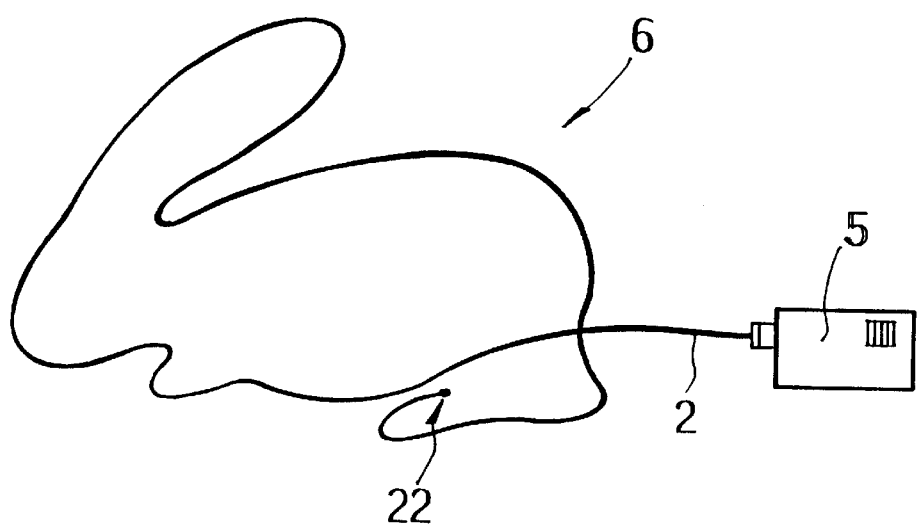
FIG. 4 shows a preferred embodiment of the invention.

FIG. 4 shows a preferred embodiment of the invention. The light emitting device 2 is bent to a desired shape 6 by bending the flexible supporting wire 4 therein and has a standing end 22. The front end of the light emitting device 2 is connected to a light source 5 to launch light into the light emitting device 2. By this arrangement, the light emitting device 2 can form a neon-like pattern 6.

Figure 5:
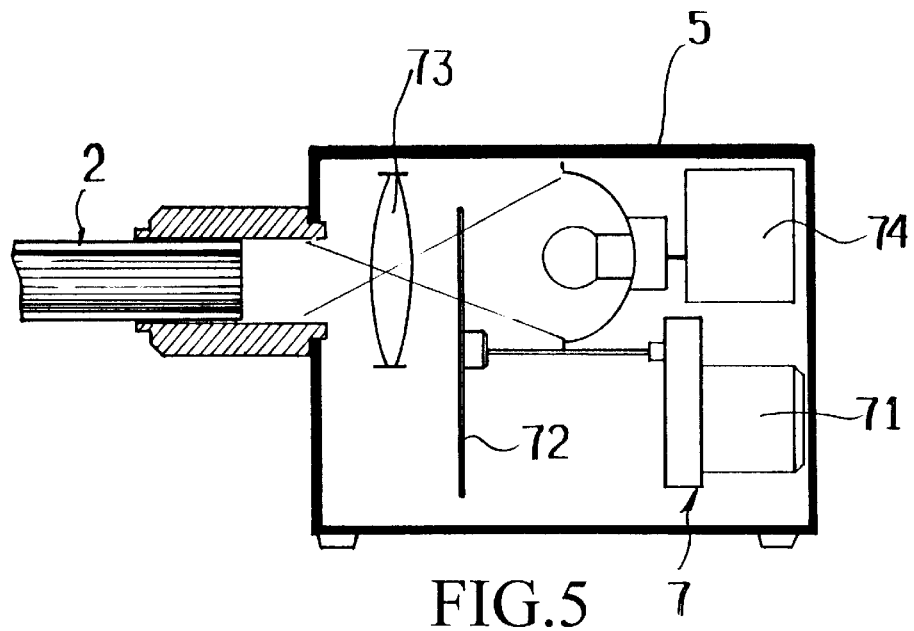
FIG. 5 shows the light emitting structure in the present invention.

FIG. 5 shows the light emitting structure in the present invention. A palette driving means 7 driven by a motor 71 and a palette 72 are arranged within the light source 5, a focusing lens 73 is provided between the palette 72 and the light emitting device 2 to focus the light from the light emitting module 74 into the plurality of optical fibers 31, 32 and 33. By using the palette 72, the light emitting device 2 can emit colorful and bright light.

Figure 6:
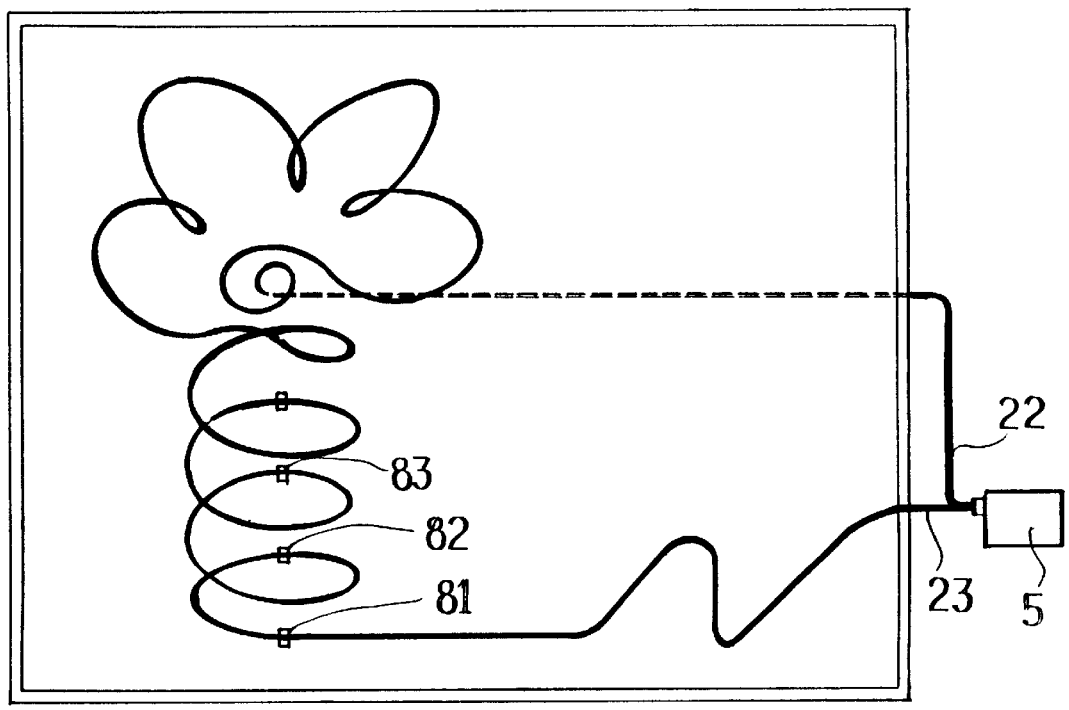
FIG. 6 shows the second preferred embodiment of the invention.

FIG. 6 shows the second preferred embodiment of the invention. The light emitting device 2 is wrapped around a fixing plate 8, and a plurality of locking means 81, 82 and 83 etc. are arranged on the light emitting device 2 to lock the light emitting device 2. Moreover, the front and rear end of the light emitting device 2 are connected to the light source 5 such that the light emitting device 2 has more uniform brightness.

Figure 7:
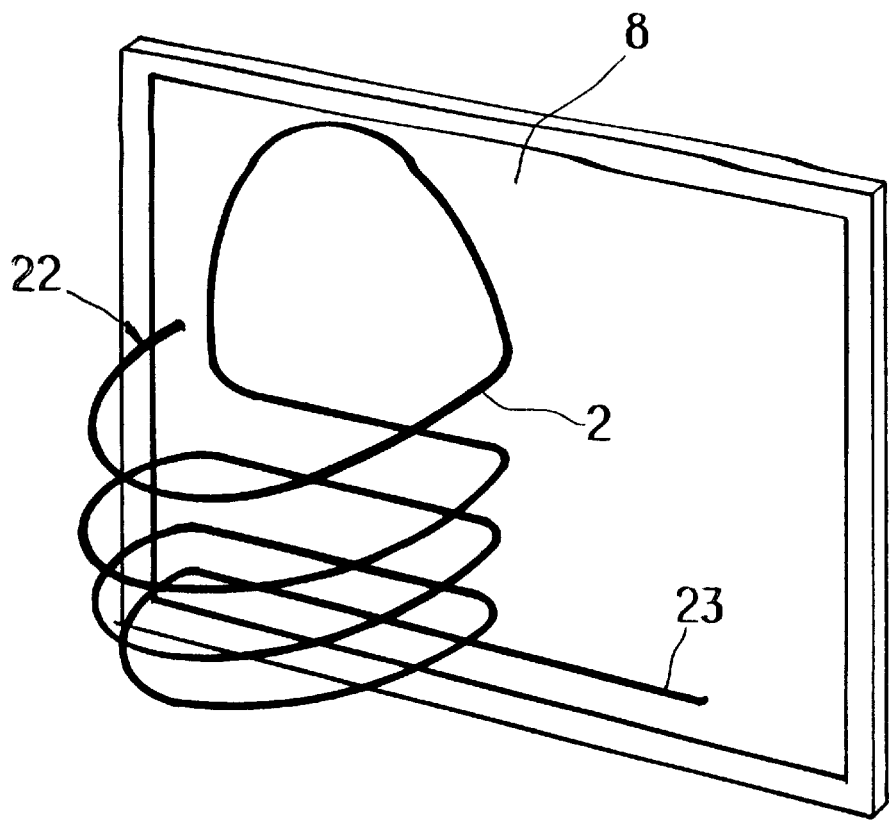
FIG. 7 shows the third preferred embodiment of the invention.

FIG. 7 shows the third preferred embodiment of the invention. The light emitting device 2 can be hung on the fixing plate 8 to provide a suspending light such as a lantern.

Figure 8:
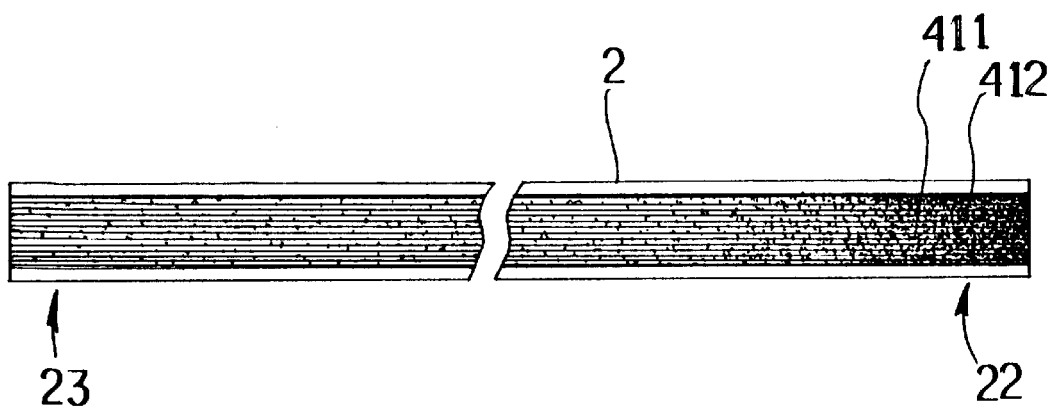
FIG. 8 shows another feasible distribution of micro-windows in the present invention.

FIG. 8 shows another feasible distribution of micro-windows in the present invention. To make the rear end 22 have a similar brightness to the front end 23, the density of the micro-windows 411 and 412 on the rear end 22 is larger than that of the front end 23. By using the compensation of micro-window density, the influence of light propagation loss along the fibers can be minimized.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A light emitting device for emitting neon-like light, comprising a transparent pipe,
a plurality of optical fibers within said transparent pipe, a protecting pipe within said transparent pipe, a flexible supporting wire arranged within said protecting pipe, and a plurality of micro-windows cut on the surface of said optical fibers such that light propagating along said fibers leak from said micro-windows, thus providing a surface emitting effect.

2. The light emitting device for emitting neon-like light as in claim 1, wherein a gap is formed between said protecting pipe and said flexible supporting wire.

3. The light emitting device for emitting neon-like light as in claim 1, wherein the thickness of said protecting pipe can be increased to fill said gap.

4. The light emitting device for emitting neon-like light as in claim 1, wherein the depth of said micro-windows is at least equal to the thickness of the cladding of the fibers.

5. The light emitting device for emitting neon-like light as in claim 1, wherein the density of said micro-windows on a rear end of said fiber is larger than the density of said micro-windows on a front end of said fiber.

6. The light emitting device for emitting neon-like light as in claim 1, wherein said protecting pipe can be omitted.

* * * * *